(12) United States Patent
Rudmik

(10) Patent No.: US 6,551,109 B1
(45) Date of Patent: Apr. 22, 2003

(54) COMPUTERIZED METHOD OF AND SYSTEM FOR LEARNING

(76) Inventor: Tom R. Rudmik, 104 Shawnee Garden Southwest, Calgary, Alberta (CA), T2Y 2T9

( * ) Notice: Subject to any disclaimer, the term of this patent is extended or adjusted under 35 U.S.C. 154(b) by 308 days.

(21) Appl. No.: 09/660,827

(22) Filed: Sep. 13, 2000

(51) Int. Cl.$^7$ ................................................ G09B 3/00
(52) U.S. Cl. ...................................... 434/322; 434/335
(58) Field of Search ................................. 434/322, 335, 434/350, 353, 354, 356, 156, 157, 323

(56) References Cited

U.S. PATENT DOCUMENTS

| | | | | |
|---|---|---|---|---|
| 4,193,210 A | * | 3/1980 | Turnquist | 434/335 |
| 4,712,180 A | | 12/1987 | Fujiyama et al. | 364/419 |
| 5,616,033 A | * | 4/1997 | Kerwin | 434/118 |
| 5,788,508 A | | 8/1998 | Lee et al. | 434/350 |
| 5,827,071 A | | 10/1998 | Sorensen et al. | 434/323 |
| 5,864,869 A | | 1/1999 | Doak et al. | 707/104 |
| 5,879,162 A | | 3/1999 | Bergman | 434/118 |
| 5,904,485 A | * | 5/1999 | Siefert | 434/322 |
| 5,934,909 A | | 8/1999 | Ho et al. | 434/362 |
| 5,947,747 A | | 9/1999 | Walker et al. | 434/354 |
| 5,961,333 A | * | 10/1999 | Harrison et al. | 434/322 |
| 6,022,221 A | * | 2/2000 | Boon | 434/156 |
| 6,024,574 A | | 2/2000 | Errthum | 434/216 |
| 6,032,141 A | | 2/2000 | O'Connor | 706/45 |
| 6,112,049 A | * | 8/2000 | Sonnenfeld | 434/350 |
| 6,157,808 A | * | 12/2000 | Hollingsworth | 434/350 |
| 6,419,496 B1 | * | 7/2002 | Vaughan, Jr. | 434/322 |

* cited by examiner

Primary Examiner—Derris H. Banks
Assistant Examiner—Kurt Fernstrom
(74) Attorney, Agent, or Firm—I. Zborovsky

(57) ABSTRACT

In a computerized method of and system for learning an information, the information is subdivided into a plurality of portions, and a plurality of sets of questions, each related to a respective one of said portions; a plurality of reviews of the portions of the information are performed by a learner in accordance with a computer program; during each review at least one of said portions called from the storage is displayed as an electronic page on a display, and a content of the electronic page is reviewed; on the display from the storage successively one after the other, questions are presented related to the displayed electronic page; the learner inputs indications whether the learner knows an answer to a corresponding question or the learner does not know the answer at least adequately; in response to the learner's inputting the indication that the learner knows the answer to a corresponding question, by the program the question is promoted to a later review; in response to the learner's inputting the indication that the learner does not know the answer to a corresponding question adequately, by the program the question is promoted to an earlier review; and the reviews are performed with time intervals which increase from one review to another.

21 Claims, 3 Drawing Sheets

Knowledge Retention

Current learning rate: N/4
Date of last review: 2000-07-18
Total number of questions to review: 8
Number of questions for review today
(advanced): 13
Estimated time to complete today's
review: 1 minute,
20 seconds Note: During your review sessions, click I remember this only if you can recall the information before looking at the answer.

⊙ begin review      ⊙ return to eBook

*FIG. 3*

Question (1 of 10):
When self-customizing menus are turned on, if you leave a menu open long enough, what will it do?

Answer:
expand automatically

⊙ I remembered this
⊙ I did NOT remember this      ⊙ read about it   ⊙ quit review

*FIG. 4*

COMPUTERIZED METHOD OF AND SYSTEM FOR LEARNING

BACKGROUND OF THE INVENTION

The present invention relates to a computerized method of and system for learning.

Numerous methods and systems have been developed for learning information by learners. Some of such methods and systems are disclosed for example in U.S. Pat. No. 4,712,180; 5,788,508; 5,827,071; 5,864,869; 5,879,162; 5,934,909; 5,947,747; 6,024,574; and 6,032,141. While these patents disclose various solutions to a computerized learning process, it is believed that they can be further improved.

SUMMARY OF THE INVENTION

It is therefore an object of the present invention to provide a new computerized method and a system for learning.

In keeping with these objects and with others which will become apparent hereinafter, one feature of present invention resides, briefly stated in a method of computerized learning of information which includes storing in a storage the information subdivided into a plurality of portions, and a plurality of sets of questions each set related to a respective one of said portions; performing a plurality of reviews of said portions of the information by a learner in accordance with a computer program; displaying during each review at least one of said portions called from the storage as an electronic page on a display and reviewing a content of said electronic page by a learner; presenting on the display from the storage successively one after the other, questions related to the displayed electronic page; inputting by the learner indications whether the learner knows an answer to a corresponding question or the learner does not know the answer at least adequately; in response to the learner's inputting the indication that the learner knows the answer to a corresponding question, promoting by the program said question to a later review; and in response to the learner's inputting the indication that the learner does not know the answer to a corresponding question adequately, promoting by the program said question to an earlier review; and performing the reviews with time interval which increase from one review to another.

In accordance with another feature of present invention, a system for computerized learning of information is proposed, which has a storage of the information subdivided into a plurality of portions, and a plurality of sets of questions each set related to a respective one of said portions; means for performing a plurality of reviews of said portions of the information by a learner in accordance with a computer program; means for displaying during each review at least one of said portions called from the storage as an electronic page on a display and reviewing a content of said electronic page by the learner; means for presenting on the display from the storage successively one after the other, questions related to the displayed electronic page; means for inputting by the learner indications whether the learner knows an answer to a corresponding question or the learner does not know the answer at least adequately; means operative for, in response to the learner's inputting the indications that the learner knows the answer to a corresponding question, promoting by the program said question to a later review; means operative for, in response to the learner's inputting the indication that the learner does not know the answer to a corresponding question adequately, promoting by the program said question to an earlier review; and means for initiating the reviews with time intervals which increase from one review to another.

When the method is performed and the system is designed in accordance with the present invention, it provides an efficient learning of information by learners.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing an electronic page which is displayed on a display before a beginning of each subsequent review of the information by a learner;

FIG. 4 is a view showing an electronic page which is displayed on a display during each subsequent review;

DESCRIPTION OF PREFERRED EMBODIMENTS

In accordance with a new method and system of learning an information, such as for example a course or the like, the information is subdivided into a plurality of portions, and for each portion a set of questions is provided. The questions are related to most important parts of the corresponding portion, whose knowledge is necessary to learn the information. Both the portions of the information and the sets of questions are stored in a known manner in a storage. The storage can be either a memory of a corresponding computerized device, or a mobile memory carrier, or a web-based delivery system, or a wireless mobile communication device. In accordance with the invention, a learner performs a plurality of reviews of the portions of the text in correspondence with a program specified by a software.

Figure 1:
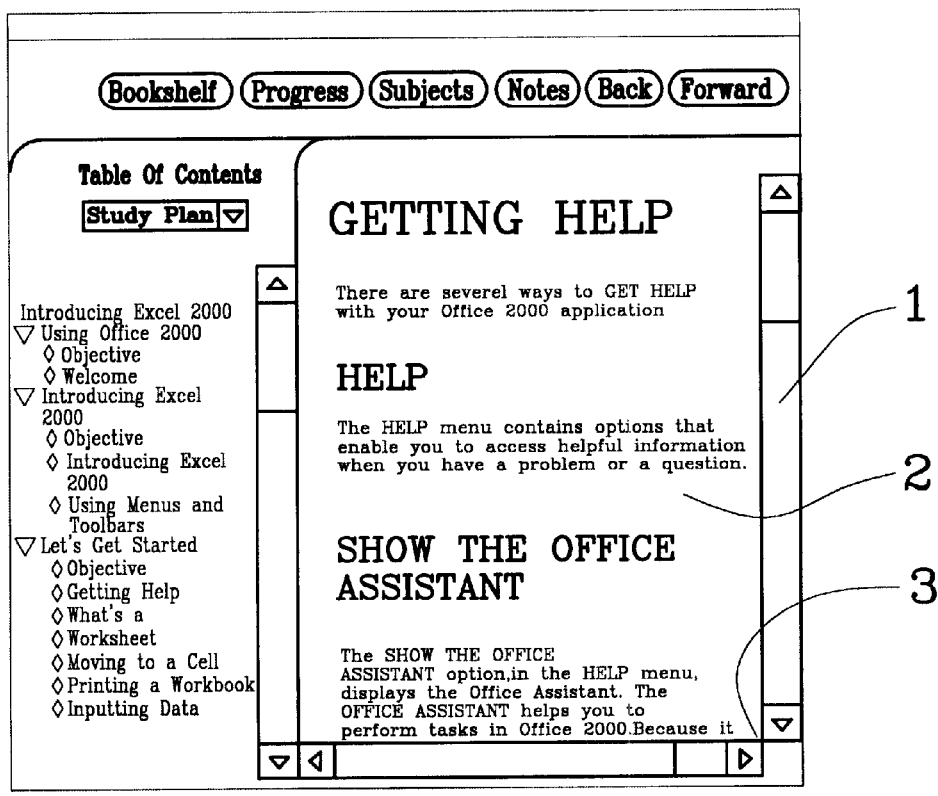
FIG. 1 is a view showing an electronic page which is displayed on a display and corresponds to a portion of the information to be learned by a learner.

At the start of the process, a learner automatically obtains from the storage each portion of the information represented by an electronic page on the display, as shown in FIG. 1 and identified with reference numeral 1. The learner reviews a content of the electronic page identified by reference numeral 2 and memorizes it. A button 3 at the bottom of each page is used to flip to the next unread page.

Figure 2:
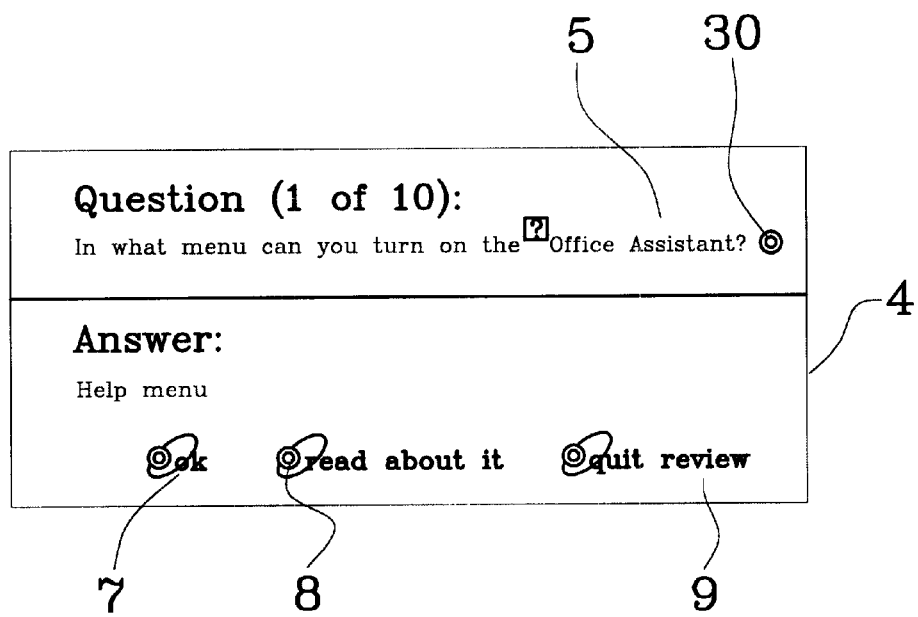
FIG. 2 is a view showing an electronic page which is displayed on a display a question related to a corresponding portion of the information.

After reviewing the content of the electronic page 1, the learner automatically obtains from the storage one after the other questions related to the displayed electronic page, as shown in FIG. 2. This electronic page is identified with reference numeral 4. It exhibits a question 5, and thereafter with a time delay of 3–4 seconds exhibits an answer 6 to this question. For each question 5 that is delivered, the learner can click "OK" 7 on the display which indicates that he understands the concept, a learning bit (question) is promoted into a retention pool, and a next question will be displayed. Alternatively, the learner can click "Read About It" 8, and in response to this, the e-page 1 to which the question 5 pertains is again displayed on the display, so that the learner can review the subject matter again and learn it. There is also an alternative to "Quit Review" 9, and the system marks the e-page as not having been completed.

Once all questions have been delivered for page 1, a next unread page is presented on the display. The presentation of the next page is activated automatically by the program itself when the last question related to the previous page has been delivered.

Once the last page in the information to be learned (the course or the like) is delivered, the learner then becomes responsible for starting the system each subsequent day. When the learner starts the review, he sees a page 10 listing the particulars of the learner's personal knowledge retention 11. For example, these particulars can include a current learning rate, a date of a last review, a total number of questions for review today, an estimated time to complete today's review, etc., or in other words the description of what information the learner retains in his/her memory. The learner can click "Begin Review" 12 to invoke the retention system in order to perform a review, or he can click "Read eBook" 13 to carry on with the learning from where they left off from their last learning session which will be presented to him automatically, as shown in FIG. 3.

For each question displayed on the screen there is a button which will open a window in the page, in which the learner can type a clue 30 to aid him in remembering the answer to the question. The clue will then be stored with the question, and can be displayed by the learner whenever that question is delivered during a review session.

In accordance with the present invention the learning or the actual training time can vary. The examples are presented below.

Scenario 1—Training Completed in One Day

Example: Trainingware contains 200 learning bits linked to 20 e-pages with 10 learning bits per page.

The next day as the learner starts their review they will be given only a portion (10 new learning bits) from the total of 200 learning bits. This is done randomly. The random selection only occurs once for a learning bit prior to its first review (R1). After a learning bit enters R1 its subsequent review date is determined by how they answer the questions as well as which review level the learning bit has been promoted to. Therefore, if 10 new learning bits are presented for review each day it should take 20 days for all of the learning bits to be presented to the learner at least once. Naturally, during that 20 day window the learner will have started R2 with most of the learning bits as well as R3 with some of the data. The system defaults to 10 new learning bits per day from the retention pool, which may contain all of the learning bits (200) if they have completed the entire training, or a portion of the total (<200) if they are part way through the training.

|  | New Learning Bits R1 | Promoted Learning Bits R2 |
| --- | --- | --- |
| Day 1 | 10 |  |
| Day 2 | 10 | These learning bits will |
| Day 3 | 10 | assuming the learner |
| Day 4 | 10 |  |
| Day 5 | 10 | 10 |

Scenario 2—Completion of Training Training Takes Several Days

Example: Training contains 200 learning bits linked to 20 e-pages, with 10 learning bits linked to each e-page.

The learner completes 3 e-pages on day 1, therefore the retention pool has 30 learning bits added to it for that day.

The review should begin the next day. The learner is asked to complete his review before he starts any new training. The learner will be presented 10 learning bits randomly selected from the retention pool of 30 questions.

The learner will continue to add to the retention pool learning bits by completing the e-pages in the training.

If the training takes a total of 5 consecutive days, then by the end of the 5 days all 200 learning bits will have been sent to the retention pool. However, during that five days of training 40 of those learning bits will have been reviewed once (R1) leaving a total of 160 learning bits in the retention pool.

| Day | Number of e-pages learned that day | Number of Learning bits sent to Retention Pool | Review R1 | Number of Learning Bits left in Retention Pool that have not been engaged into the AKRS |
| --- | --- | --- | --- | --- |
| 1 | 4 | 40 |  | 40 |
| 2 | 4 | 40 | 10 | 70 |
| 3 | 4 | 40 | 10 | 100 |
| 4 | 4 | 40 | 10 | 130 |
| 5 | 4 | 40 | 10 | 160 |

Never will the learner be presented all the learning bits in the retention pool unless their number equals the number of new learning bits (default value of 10) or the learner clicks the Review All button, which presents all the questions but does not alter the retention system.

Each review is performed in the following manner.

Figures 5, 6:
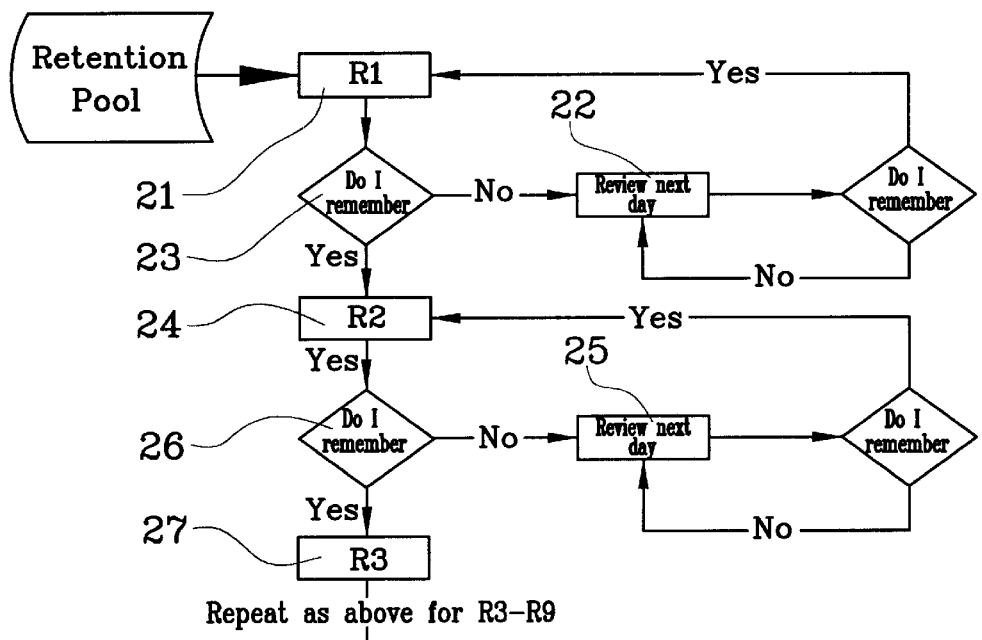
FIG. 5 is a view illustrating a retention learning bit (question) timeline.
FIG. 6 is a view showing a flowchart illustrating a part of the inventive method and system.

The learner sees on the display a page 14 with a question 15 (a key learning bit) as shown in FIG. 5, and an answer 16 which will appear with a delay. Each particular question or learning bit is treated as a separate entity. If during the review the learner finds that he remembers an answer to the question, he clicks "I Remember This" 17 and the question is promoted to a later review which can be a few days later. If the learner determines that he does not remember this, he clicks "I Forgot This" 18 and the corresponding question is promoted to an earlier review, for example the next day. Other options on the page 14 are "Read About It" 19 and "Quit Review" 20.

In accordance with the present invention, the time intervals between the reviews increase from one review to another. It has been found that this is critically important for retention of knowledge by the learners. The program of the inventive system automatically initially sets such time intervals.

The following is one example of a possible sequencing of the reviews.

|  |  | review intervals days | Cumulative days |
| --- | --- | --- | --- |
| First Review | R1 R1 = R0 + 1 | 1 | 1 |
| Second Review | R2 R2 = f(R1) + 2 | 4 | 5 |
| Third Review | R3 R3 = f(R2) + 1 | 9 | 14 |
| Fourth Review | R4 R4 = f(R3) | 17 | 31 |
| Fifth Review | R5 R5 = f(R4) | 32 | 63 |

-continued

|  |  | review intervals days | Cumulative days |
|---|---|---|---|
| Sixth Review | R6 R6 = f(R5) | 61 | 124 |
| Seventh Review | R7 R7 = f(R6) | 116 | 240 |
| Eighth Review | R8 R8 = f(R7) | 220 | 460 |
| Ninth Review | R9 R9 = f(R8) | 418 | 878 |

In this table R0 is a date of the initial learning, and this learning bit or question was activated by clicking "OK" immediately after the reading of the corresponding e-page R1–R9 are review levels. R1 is a first review which takes place one day after the initial learning or several days later; R2 takes place four days after the first review R1 or five days after the initial learning R0, etc. f is a promotion factor, and it is equal to 1.9.

In accordance with the present invention the time intervals between each review can be adjusted, based on an ability of a learner to learn or on the difficulty of the material being presented. The adjustments are performed automatically. The program receives the results from the preceeding reviews, which results are indicative of the learners ability to learn and the difficulty of the information to be learned. For example, the increasing numbers of repeats of the learner's "I Forgot This" clicks shows that either his ability to learn is lower or the information is more difficult. In this case the program reduces the time between each review, as shown herein below.

| ADJUSTMENT FOR DIFFICULT MATERIAL | |
|---|---|
| Review Intervals | Cumulative |
| 1 | 1 |
| 2 | 3 |
| 4 | 7 |
| 8 | 15 |
| 15 | 30 |
| 29 | 59 |
| 55 | 114 |
| 105 | 219 |
| 200 | 419 |

At the start of a day's review, the system obtains a small number of learning bits or questions from the study plan's learning bit retention pool illustrated in FIG. 5 and marks them as having started the retention timeline at level R1. Added to those additional learning bits or questions is a subset of learning bits or questions that have been previously reviewed. Thus the learning bits comprising a particular day's review propagates through the retention timeline similar to that shown in FIG. 5.

Determining which learning bits or questions should be displayed on a particular day would be a significant logistic burden if the learner has to track the learning bits or questions manually. In accordance with the present invention the process is automated by tracking each learning bit or question individually within a database. Each learning bit is also tagged with specific information indicating the date that the learning bit or question should be displayed. Learning bits that were forgotten automatically update the database so that they are displayed during the next day's review. Learning bits or questions that were remembered update the database so that they are displayed at the appropriate date in the future, as determined by the retention equations.

Given that the learning bits or questions, their answers, and their display dates are all stored within the system or within the database another feature of the present invention is the ability to generate reports that tracks a learner's knowledge retention progress. Examples of reports provided by the system include the data when they last performed a review, as well as the number of learning bits or questions they remembered versus the number they forgot (i.e. the learner's learning rate).

The system in accordance with the present invention self-organizes the reviews for the learner on a daily basis. Each review takes approximately 5–8 seconds.

FIG. 6 shows a flowchart of the reviews in accordance with the present invention. Once a learning bit or question is obtained from the retention pool, the learning question is initialized to stage R1 at 21. During the first day's review the learning bit or question is presented to the learner. If the learner did not remember the learning bit its review date is incremented by one so that the learning bit or question will be asked the next day at 22. If the learner remembers the learning bit at 23, its review date is incremented according to the above presented table or retention algorithm (in this case f(R1)+2=4 days). The learning bit's stage is also incremented to stage R2 at 24. Thus, the next time the learner will see that particular learning bit or question will be four days later.

Once four days has elapsed (the learner has also been reviewing other learning bits or questions), the learning bit or question is again displayed to the learner during the current day's review. As with the R1 review, if the learning bit or question was forgotten, its day is incremented by one so that the learning bit or question will be asked again the next day at 25. However, the learning bit's review stage remains at R2. If the learning bit or question was remembered at 26, its review date is again incremented according to the above presented table or retention algorithm (in this case f(R2)+1=9 days) and the retention level is incremented to R3 at 27.

As a learning bit or question continues to be remembered, the intervals between the dates the question is asked become longer and longer, thus over time the learning bits or questions the learner has difficulty remembering are asked much more frequently than the learning bits or questions they remembered.

The adaptive nature of the inventive system senses if the learner is having difficulties with the reviews. If, for example, the learner is scoring below 80% on R2 (after a set number of reviews), the system will decrease the review interval time for R2 and R3. The example was presented herein below.

If the learner learns from multiple e-books, they can be stored in separate database files. However, the learner will not have to start and stop one e-book to review another, since the program will deliver appropriate questions from each database systematically during the same review. Only the title of the corresponding e-book will appear, to differentiate between each database of questions.

At any time the learner can click a progress report button to display the learner's progress. An e-page showing the progress report is presented to the learner.

The e-book provider can also look at the learner's statistics, for example regarding the following:

Where they went during the content delivery? How often they are using the repetition of questions? How they are doing regarding retention today?, All information in the learner's progress page.

The system in accordance with the present invention has main components which are presented herein below.

eBooks—The system manages the eBooks that collectively represent the subject matter. Each eBook is comprised of a collection of HTML and/or XHTML files, one file per eBook page, and a special Table Of Contents file representing the eBook's organizational structure. Also contained within the Table Of contents file are the various retention learning bits associated with each eBook page.

Database—The Database is a central component of the architecture. The database contains several tables of information regarding the various learners, the eBooks and their structure, as well as the retention learning bits associated with each eBook.

eBook Processor—The eBook Processor reads the information encoded in an eBook's Table of Contents file (e.g., eBook structure, retention learning bits) and stores the information in the database for subsequent access. The eBook processor also converts eBook XHTML pages into the corresponding HTML representation.

GUI—The Graphical User Interface extracts information from the eBook HTML files and database for presentation to the learner. This GUI also responds to learner actions and updates the database accordingly.

Retention Manager—The Retention Manager is responsible for managing the display of retention learning bits during a learner's review. This Retention Manager interacts with the database to select the subset of retention learning bits to be displayed on any particular day. It also interacts with the database and GUI to update the retention information according to whether or not the learner remembered the learning bits.

Mobile Device Retention Manager (MDRM)—The Adaptive Knowledge Retention System built into the System can be deployed on a number of mobile devices such as a Palm PDA device or a mobile phone using the MDRM. The mobile user will be able to download their retention pool of learning bits and will be able to proceed with their learning (reviews as presented by the MDRM) in a similar manner as they would on a web-connected computer.

The mobile user will be able to synchronize their device with the central System database downloading the tracking data for each learning bit as well as uploading any new learning bits. The user will be able to seamlessly move back and forth from a web-connected PC to a mobile device as long as the synchronization process has been performed.

Hand-Held Synchronization Manager (HHSM)—The HHSM is responsible for synchronizing the System application when residing on a hand-held device with the retention information contained within the database.

More detailed explanations of learning bits or questions and of their use is presented below.

Associated with each eBook page is a collection of one or more learning bits pertaining to the learning material (subject matter) on that page. Once the learner finishes reading a particular page, the system sequentially displays to the learner each learning bit that is associated with that page. This "quick review" enables the learner to gauge whether or not he understood the essential knowledge associated with that page. Once the learner acknowledges understanding of the learning bits by clicking OK, the system stores the learning bits in a Retention Learning Bit Pool (RP) for that eBook. Since learning bits are only added to the RP after the learner reads the corresponding page, the RP also serves to partition the learning bits associated with pages that have been read from learning bits associated with pages that have not yet been read. Thus, over time, the number of learning bits stored in the RP continually increases as the learner reads the eBook.

Upon reading the first eBook page, the learner is ready to start performing reviews. The next day, prior to reading additional eBook pages, they review the previous days' retention learning bits. However, since reviewing a potentially large number of learning bits at one time might overwhelm the learner, only a subset of learning bits is displayed each day.

How does the system know which learning bits to display? Each learning bit is tagged with a field specifying the date of the next review. As each learning bit is extracted from the RP, the learning bit's date field is initialized to the current date. Each time that learning bit is presented to the learner, the next review date is calculated according to the Retention Algorithm. Since each learning bit specifies its next review date, the learning bits to be shown on a particular day are obtained from the database by a simple database query (e.g., SELECT*FROM tblLearning bit WHERE nextReviewDate<=today).

FIG. 5 graphically illustrates the first two stages of the Retention Algorithm. The algorithm starts in the top left corner, as a subsequent of learning bits are obtained from the RP each day and are started on the retention timeline. Since each learning bit proceeds through the timeline independent of any other learning bit, the remainder of the example will consider the timeline for a single learning bit.

Once a learning bit is obtained from the RP, the learning bit is initialized to stage R1. During the first day's review, the learning bit is presented to the learner. If the learner did not remember the learning bit, its review date is incremented by 1 so that the learning bit will be asked the next day. If the learner remembered the learning bit, its review date is incremented according to the Retention Algorithm (in this case f(R1)+2=four days). The learning bit's stage is also incremented to stage 2. Thus, the next time the learner will see that particular learning bit will be four (4) days later.

Once four days has elapsed (the learner has also been reviewing other learning bits), the learning bit is again displayed to the learner during the current day's review. As with the R1 review, if the learning bit was forgotten, its date is incremented by 1 so that the learning bit will be asked again the next day. However, the learning bit's review stage remains R2. If the learning bit was remembered, its review date is again incremented according to the Retention Algorithm (in this case f(R2)+1=nine days) and the learning bit's stage is incremented to R3.

As a learning bit continues to be remembered, the intervals between the dates the learning bit is asked becomes longer and longer. Thus, over time, the learning bits the learner had difficulty remembering are asked much more frequently than learning bits they remembered.

In accordance with the present invention certification exams may be delivered once the material has been learned. The examples of the certification exam are presented below.

Option 1—An exam is delivered automatically when the system determines that the learner has attained a high enough competency to write the exam. Generally, the learner will have completed at least R3 for all the retention bits. This is adjustable by the training developer depending on the difficulty of the exam. The system will notify the learner of the approximate date of the exam when they begin their reviews.

Option 2—The Learner defines the date of exam, which can be any exam; even one that is independent of the PLSystem. The system will adjust the number of new reviews per day accordingly.

For example, if the exam date is 60 days away, but the learner desires to take the exam earlier, the system will increase the number of new reviews per day to accommodate the accelerate pace of learning. The number of new questions per day is increased, so instead of 10 new questions per day, the learner may be presented with 20 new questions per day.

It will be understood that each of the elements described above, or two or more together, may also find a useful application in other types of constructions differing from the types described above.

While the invention has been illustrated and described as embodied in a computerized method of and a system for learning, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A computerized method of learning, comprising the steps of
    storing in a storage the information subdivided into a plurality of portions, and a plurality of sets of questions, each set related to a respective one of said portions;
    performing a plurality of reviews of said portions of the information by a learner in accordance with a computer program;
    displaying during each review at least one of said portions called from the storage as an electronic page on a display and reviewing a content of said electronic page by the learner;
    presenting on the display from the storage successively one after the other, questions related to the displayed electronic page;
    inputting by the learner indications whether the learner knows an answer to a corresponding question or the learner does not know the answer at least adequately;
    in response to the learner's inputting the indication that the learner knows the answer to a corresponding question, promoting by the program said question to a later review;
    in response to the learner's inputting the indication that the learner does not know the answer to a corresponding question adequately, promoting by the program said question to an earlier review;
    performing the reviews with time intervals which increase from one review to another; and
    during each subsequent review, presenting on the display, successively one after the other, questions related to at least one electronic page displayed during a preceding review; and inputting by the learner indications whether the learner remembers an answer to a corresponding question, or does not remember the answer to the corresponding question, or the learner is willing to read about it, and if the learner does not remember the answer to the corresponding question or is willing to read about it the electronic page which contains an answer to said question is displayed on the display.

2. A method as defined in claim 1; and further comprising the step of at least one repeat displaying, during the same review, of the same electronic page by the program, in response to the learner's inputting the indication that the learner does not know adequately the answer to a corresponding question, to enable the learner to find and memorize the adequate answer to said question.

3. A method as defined in claim 1; and further comprising, before each subsequent review, inputting by the learner indications to begin a review or to return to at least one of said electronic pages displayed during at least one proceeding review, so as to start the subsequent review or to display said at least one electronic page again correspondingly.

4. A method as defined in claim 1; and further comprising activating by the learner on the display an electronic page which lists particulars of results of preceding reviews by the learner.

5. A method as defined in claim 1; and further comprising varying time periods between the reviews in correspondence with a learner's ability to learn, determined by a learner's performance during the reviews.

6. A method as defined in claim 1; and further comprising varying time periods between the reviews in correspondence with a content of the information to be learned determined by a learner's performance during the reviews.

7. A method as defined in claim 1; and further comprising activating by an information provider on the display an electronic page related TO the information.

8. A method as defined in claim 1; and further comprising activating for at least some of the questions by the learner on the display a clue associated with the corresponding question, so that during subsequent displaying of the question on the display said clue is also displayed on the display.

9. A method as defined in claim 1; and further comprising selectively varying an actual learning time.

10. A method as defined in claim 1; and further comprising delivering a certification exam once the information has been learned.

11. A computerized system for learning, comprising
    a storage of the information subdivided into a plurality of portions, and a plurality of set of questions each sets related to a respective one of said portions;
    means for performing a plurality of reviews of said portions of the information by a learner in accordance with a computer program;
    means for displaying during each review at least one of said portions called from the storage as an electronic page on a display and reviewing a content of said electronic page by the learner;
    means for presenting on the display from the storage successively one after the other, questions related to the displayed electronic page;
    means for inputting by the learner indications whether the learner known an answer to a corresponding question or the learner does not know the answer at least adequately;
    means operative for, in response to the learner's inputting the indications that the learner knows the answer to a corresponding question, promoting by the program said question to a later review;
    means operative for, in response to the learner's inputting the indication that the learner does not know the answer to a corresponding question adequately, promoting by the learner said question to an earlier review; and
    means for initiating the reviews with time intervals which increase from one review to another.

12. A system as defined in claim 11; and further comprising means operative for at least one repeat displaying, during the same review, of the same electronic page by the program, in response to the learner's inputting the indication that the learner does not know adequately the answer to a corresponding question, to enable the learner to find and memorize the adequate answer to said question.

13. A system as defined in claim 11; and further comprising means operative for, before each subsequent review, inputting by the learner indications to begin a review or to return to at least one of said electronic pages displayed during at least one preceding review, so as to start the subsequent review or to display said at least one electronic page again correspondingly.

14. A system as defined in claim 11; and further comprising means operative for during each subsequent review, presenting one of the display, successively one after the other, questions related to at least one electronic page displayed during a preceding review; and inputting by the learner indications whether the learner remembers an answer to a corresponding question or does not remember the answer to the corresponding question, or the learner is willing to read about it, and if the learner does not remember the answer to the corresponding question or is willing to read about it the electronic page which contains an answer to said question is displayed on the display.

15. A system as defined in claim 11; and further comprising means for activating by the learner on the display an electronic page which lists particulars of results of preceding reviews by the learner.

16. A system as defined in claim 11; and further comprising varying time periods between the reviews in correspondence with a learner's ability to learn, determined by a learner's performance during the reviews.

17. A system as defined in claim 11; and further comprising means for varying time periods between the reviews in correspondence with a content of the information to be learned, determined by a learner's performance during the reviews.

18. A system as defined in claim 11; and further comprising means for activating by an information provider on the display an electronic page related to the information.

19. A system as defined in claim 11; and further comprising means for activating for at least some of the questions by the learner on the display a clue associated with the corresponding question, so that during subsequent displaying of the question said clue is also displayed on the display.

20. A system as defined in claim 11; and further comprising means for selectively varying an actual learning time.

21. A system as defined in claim 11; and further comprising means for delivering a certification exam once the information has been learned.

* * * * *